June 25, 1957     R. F. E. STEGEMAN     2,796,803
DEVICE FOR ATTACHING MAGNIFIERS TO SPECTACLES
Filed April 5, 1954
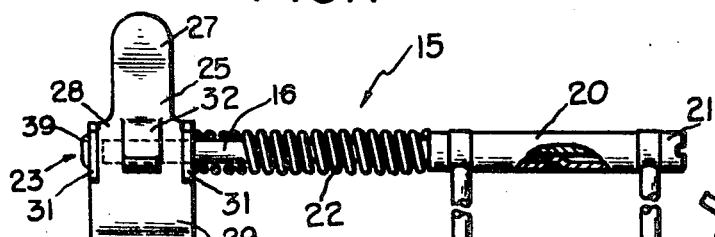
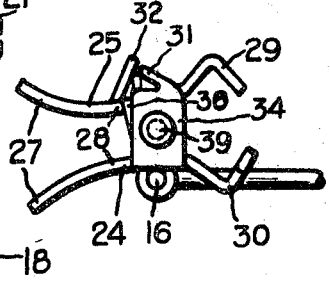
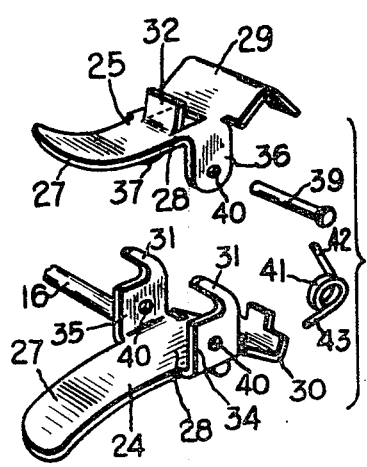
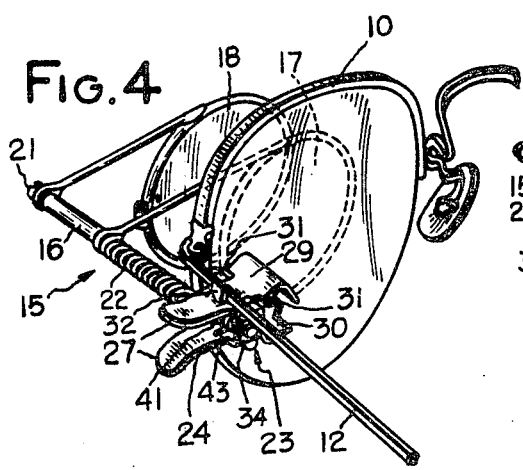
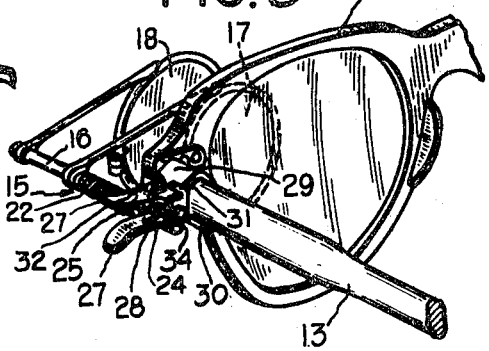
INVENTOR.
R. F. E. STEGEMAN
BY
ATTORNEYS

United States Patent Office 2,796,803
Patented June 25, 1957

2,796,803
DEVICE FOR ATTACHING MAGNIFIERS TO SPECTACLES

Raymond F. E. Stegeman, Greece, N. Y., assignor to Bausch & Lomb Optical Company, Rochester, N. Y., a corporation of New York Application April 5, 1954, Serial No. 420,873

2 Claims. (Cl. 88—41)

This invention relates to magnifiers and more particularly it has reference to devices for detachably holding magnifying lenses on spectacles.

As presently constructed, magnifiers are manufactured with a clamping device which is adapted for use on only one size temple of a pair of spectacles. Today, however, almost as many thick size temples, i. e., plastic, zyl, or flat metal, are in use as are thin size temples, i. e., metal wire. Therefore, it is necessary for a dealer and a manufacturer to stock at least two separate magnifiers, one for use on each size temple.

It is, therefore, an object of my invention to overcome the above-noted difficulties and to provide an improved device for detachably holding magnifying lenses on different size temples of different types of spectacles.

Another object of my invention is to provide an improved device for detachably holding magnifying lenses on spectacles that is easily attached to or detached from a temple thereof using only one hand.

And a still further object of my invention is to provide an improved device for detachably holding magnifying lenses on spectacles that is efficient in use and economical to manufacture.

These and other objects and advantages reside in certain novel features of construction, arrangement and combination of parts as will hereinafter be more fully described and pointed out in the appended claims.

Referring to the drawing:

Fig. 1 is a top plan view showing one form of my improved magnifying lens attachment.

Fig. 2 is a side view of the clamping element shown in Fig. 1.

Fig. 3 is an exploded perspective view of the parts of the clamping element shown in Fig. 2.

Fig. 4 is a perspective view of my improved magnifying lens attachment clamped onto a thin size temple of a pair of spectacles.

Fig. 5 is a perspective view of my improved magnifying lens attachment clamped onto a relatively large size plastic temple of a pair of spectacles.

Referring to the drawing, and particularly to Figs. 4 and 5, 10 and 11 represent two different style spectacle frames having, respectively, a thin size temple 12 and a thick size temple 13 connected thereto in known manner. A preferred embodiment of my invention is shown in the drawing wherein a device for detachably holding a magnifying lens on one part of the temples 12, 13 is indicated generally by the numeral 15 and comprises a rod 16 upon which is revolubly mounted two magnifying lenses 17 and 18 spaced apart by a collar 20 and urged toward an abutment 21 on the rod 16 by a spring 22. Carried by the end portion of the rod 16 is a universal pinch clamp 23 comprising a pair of complementary members 24, 25, each member having a handle portion 27, a central portion 28 and two sets of clamp means or jaw portions 29, 30 and 31, 32.

The complementary member 24, best shown in detail in Fig. 3, has a pair of arms 34, 35 formed integral with the side edges of and projecting at right angles to the plane of its central portion 28. The other complementary member 25 has a similar pair of arms 36, 37 formed integral with the side edges of and projecting at right angles to the plane of its central portion 28. The arms 34, 35 of the member 24 overlie the arms 36, 37 of the other member 25 and are connected together by a pivot pin 39 passing through the aligned apertures 40 in the arms 34, 35, 36, 37 for holding the complementary member 24, 25 assembled. A coil spring 41, surrounding said pivot pin 39, has end portions 42, 43 bearing against the inner surfaces of the handle portions 27 whereby the handle portions 27 are urged apart.

The curved shaped jaw portions 29, formed on the one end of the complementary member 24, is directed toward the mating curved shaped jaw portion 30 on the other complementary member 25, so that the coil spring 41 will normally urge the jaw portions 29, 30 together into substantially clamping relation. Therefore, when it is desired to clamp the magnifier onto a relatively large or thick size temple 13 of the spectacle 11, shown in Fig. 5, the handle portions 27 are pressed together to pivot the complementary members 24, 25 about the pivot pin 39 to thereby open the jaw portions 29, 30 which may be placed about a portion of said temple 13. Release of the handle portions 27 will permit the jaw portions 29, 30 to engage the temple 13 for securely mounting the magnifier onto said temple 13.

Outwardly projecting from the ends of the arms 36, 37 of the complementary member 24 are the jaw portions or fingers 31 which are inclined so as to overlie a portion of the ends of the respective arms 36, 37. The upper ends of said arms 36, 37 and the central portion 28 of the complementary member 25 lie substantially in a common plane so that the jaw portions 31 projecting from said arms 36, 37 extend above said plane. Projecting upwardly from the plane of the central portion 28 of the complementary member 25 is the mating jaw portion or cooperating jaw 32 which lies between and in substantial alignment with the jaw portions 31 to provide an interfitting relation between said mating jaw 32 and jaw portions 31. The jaw portions 31, 32 are normally held in said aligned relation by the urging of the spring 41 against the handle portions 27. Pressing the handle portions 27 together will pivot the complementary members 24, 25 about the pivot pin 39 to thereby move the jaw portion 32 relative to the pair of jaw fingers or portions 31 to permit a relatively small, thin size temple 12 of a spectacle 10, shown in Fig. 4, to be inserted therebetween. Release of the handle portions 27 will permit the spring 41 to urge the jaw portions 31, 32 into gripping relation with the temple 12 for supporting a magnifier on the spectacle 10.

The handle portions 27, central portions 28, arms 34, 35, 36, 37, pivot pin 39 and spring 41 taken together form a common actuator means that is constructed and arranged to operate both sets of jaw portions 29, 30 and 31, 32 whenever the handle portions 27 are pressed together. Thereby said common actuator means and two sets of jaw portions combine to produce the device for detachably holding magnifying lenses on spectacles in a universal pinch clamp arrangement. The device can be attached to either thin or thick size temples by simply making use of different jaw portions on the pinch clamp.

From the foregoing, it will be apparent that I am able to attain the objects of my invention and provide a new and improved device for detachably holding a magnifying lens on spectacle temples of different sizes. My improved device for detachably holding a magnifying lens on spectacles is so constructed that it can be easily attached, by an operator using one hand, onto either the right or left temple of a spectacle. My invention further provides a magnifying lens device that is attractive in appearance, efficient in use, and economical to manufacture. Various modifications of structure can, of course, be made without departing from the sprit of my invention or the scope of the appended claims.

I claim:

1. In a magnifier for attachment to different size temples of a spectacle having an elongated rod carrying a magnifying lens, the combination of a pinch clamp carried by one end of said rod, said pinch clamp comprising a pair of complementary members, each complementary member having a jaw portion and a handle portion on opposite ends thereof, a pair of arms integrally formed with the central portion of each complementary member and projecting at right angles to the plane thereof, the complementary members being positioned with the respective arms in overlapping relation, a pivot pin passing through aligned apertures in the arms for holding the complementary members assembled, a coil spring surrounding said pin and having the end portions thereof bearing respectively against the inner surfaces of the handle portions of the members whereby the jaw portions are normally urged into clamping relation and may thereby be secured to a spectacle temple of one size, a jaw finger projecting from the end of each of the arms on one of the complementary members, and a cooperating jaw projecting outwardly from the central portion of the other complementary member and lying between and normally in substantial alignment with said jaw fingers whereby the jaw may be moved relative to the jaw fingers against the action of the spring so that a temple may be gripped between the jaw fingers and jaw.

2. In a device for detachably holding magnifying lenses on different size spectacle temples having an elongated rod carrying a magnifying lens, the combination of clamp means carried by one end of said rod, said clamp means comprising a pair of members, each member having a jaw portion and a handle portion on opposite ends thereof, a pair of spaced arms projecting at right angles to the central portion of each member and having apertures therethrough, the arms of one member overlapping the arms of the other member with the apertures aligned, a pivot pin passing through said aligned apertures in said arms for holding the members assembled, a coil spring surrounding said pin and having the ends thereof bearing respectively against the inner surfaces of the handles to urge said handles apart and to urge said jaw portions toward each other into clamping relation whereby the magnifying lenses may be held onto a spectacle temple of one size, another jaw portion carried by the central portion of one of the members, and a mating jaw portion carried by the central portion of the other member and normally lying in substantial alignment with said last-named jaw portion whereby pressing the handles together will move said mating jaw portion relative to said last-named jaw portion so that spectacle temples of a different size may be gripped therebetween for supporting the magnifying lenses onto a spectacle.

References Cited in the file of this patent

UNITED STATES PATENTS

| 1,964,243 | Behr | June 26, 1934 |
| 2,143,431 | Benzinger | Jan. 10, 1939 |